United States Patent
Jones

[15] 3,658,306
[45] Apr. 25, 1972

[54] APPARATUS FOR CONTACTING A LIQUID WITH A VAPOR
[72] Inventor: Edwin K. Jones, Kenilworth, Ill.
[73] Assignee: Universal Oil Products Company, Des Plaines, Ill.
[22] Filed: July 23, 1970
[21] Appl. No.: 57,603

[52] U.S. Cl. ...............261/114 R, 261/114 A, 261/114 JP, 261/114 VT
[51] Int. Cl. .....................................................B01d 3/18
[58] Field of Search.........261/114 R, 114 A, 114 JP, 114 VT

[56] References Cited

UNITED STATES PATENTS 2,693,949 11/1954 Huggins...........................261/114 R
2,752,139 6/1956 Huggins...........................261/114 R Primary Examiner—Tim R. Miles
Assistant Examiner—Steven H. Markowitz
Attorney—James R. Hoatson, Jr. and Ronald H. Hausch

[57] ABSTRACT

In a column for contacting a liquid with a vapor and having a plurality of vertically spaced apart vapor-liquid contacting trays therein, at least a portion of such trays are constructed such that a wall member is connected to the inlet surface of a contact tray and a perforated plate member is connected to such wall member in a manner to extend laterally inwardly above a part of the tray. The liquid flow path is directed over the wall member and across the perforated plate member to establish initial frothing of fluid and vapor prior to the distribution of the liquid flow over the remaining surface of the contact tray.

5 Claims, 5 Drawing Figures

PATENTED APR 25 1972 3,658,306
Figure 1
Figure 2
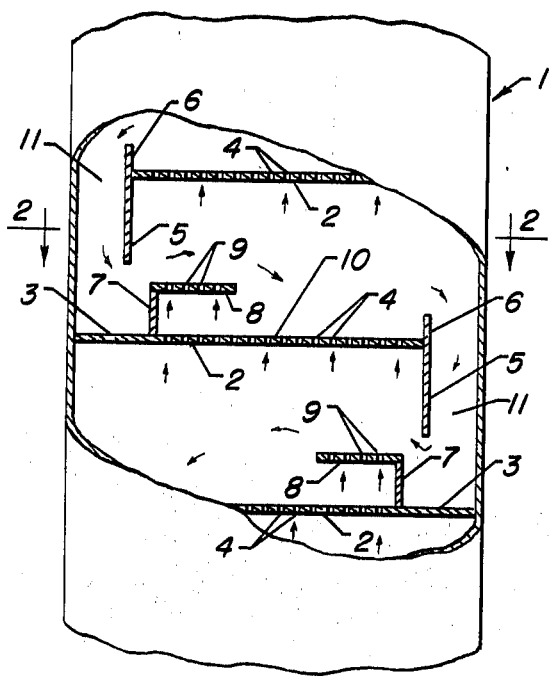
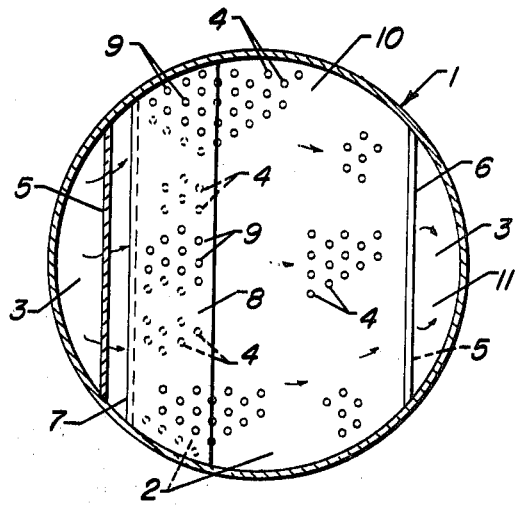
Figure 3
Figure 4
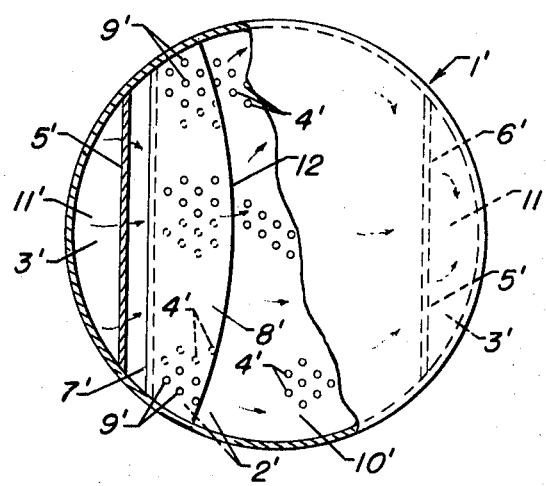
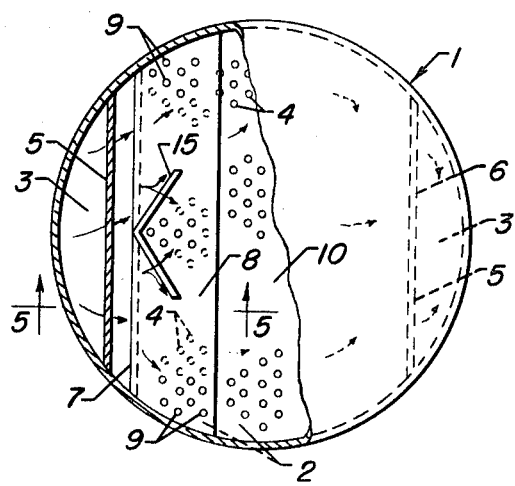
Figure 5
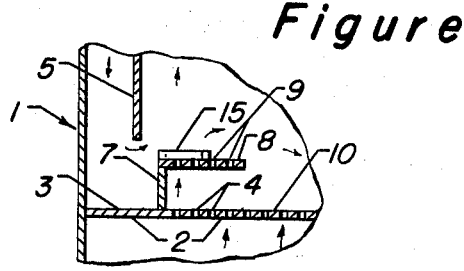
INVENTOR:
Edwin K. Jones
BY: James R. Hoatson, Jr.
Ronald H. Hausch
ATTORNEYS

APPARATUS FOR CONTACTING A LIQUID WITH A VAPOR

The present invention relates to an improved form of liquid-vapor contact tray and particularly to a means for establishing initial frothing of vapor and liquid prior to the liquid flow contacting or being distributed to the tray itself.

It is well known that in liquid-vapor contacting, e.g., in fractionation operations, a liquid is brought into contact with a rising vapor by a repetitive intermixing of the two phases. The efficiency of mass transfer of a given component between these phases is largely established by the intimacy of contact and thus it is very important to approach a phase equilibrium at as many points on the tray as possible. However, this intimate mixing and contacting has been difficult to obtain in certain operations, especially in low pressure, large diameter liquid-vapor contacting chambers.

In large diameter chambers, because of the distance from inlet to outlet points on a particular plate, a large head of liquid must be initiated at the inlet end of the tray. Because of this and especially in low pressure fractionating columns, the process vapors fail to pass through that part of the tray and thus the efficiency of the tray is reduced considerably. Hence, that portion of the contacting surface of the tray merely passes clear liquid and contributes nothing to the mass-transfer process, and in fact is apt to rain liquid to the tray below thereby bypassing the proper tray and upsetting the compositions of the next trays. In addition, because of the shorter distance the liquid has to travel near the middle of a particular tray, such a mass exchange inactivity may be more prominent near the middle of trays.

Thus, it may be considered a principal object of this invention to provide a means to eliminate mass-transfer inactivity at the inlet and at the middle of a tray used for a liquid-vapor contacting operation such as fractionation.

More particularly, it is an object of this invention to provide a means to establish frothing or foaming in the inactive liquid-inlet area and also to distribute more liquid to the perimeters of a contacting tray.

Another object of this invention is to provide a means suitable for utilization on existing liquid-vapor contacting trays and particularly sieve or valve-type trays, which will render such trays to become more efficient.

In a broad aspect, the present invention may be considered as providing a column for contacting a liquid with a vapor which includes a plurality of vertically spaced vapor-liquid contacting trays, with at least one of such trays having a perforated portion for permitting gas flow therethrough, an imperforate liquid inlet section; and downcomer means extending downwardly to terminate just above the inlet imperforate portion of the next lower tray. The improved construction includes a wall member connected to and extending above the tray with such wall member separating the imperforate portion of the tray and the perforated portion thereof whereby the liquid flow path is directed over the wall member, and a perforated plate member connected to the upper portion of the wall member extending laterally inwardly across a portion of said column above a part of the perforated portion of said tray, whereby the liquid flow path is directed over the perforated plate member to establish initial frothing of fluid and vapor prior to the distribution of the liquid flow over the perforated portion of such contact tray.

Such improved construction may be adapted to existing trays, or on the other hand, may be constructed as an original part of a tray. Because of this, such construction may be used when it is discovered that an existing tray is only partially active. When such construction is used in conjunction with a tray, it is found that the bubbling on the tray will be initiated over the perforated plate member before contacting the perforated portion of the contact tray itself. In addition, when there is any weeping or raining through the perforated plate member, the liquid will not rain to a lower contact tray but will rain to the contact tray to which the improved construction is connected to. It has been found that once bubbling or frothing of liquid and vapor is initiated such bubbling or frothing will induce conditions favorable to bubbling throughout the tray proper. Preferably, means is provided to establish a uniform flow of liquid across the tray proper. This can be done by curving the downflow side of the perforate plate member or by adding directional vanes to the top of the perforate plate.

Reference to the accompanying drawing and the following description thereof will serve to point out and more fully illustrate the design and construction of this invention as well as to assist in further pointing out the advantageous features in connection therewith.

FIG. 1 is a partial elevational view shown in section of a liquid-vapor contacting column, utilizing the improved contact plate member of the present invention.

FIG. 2 is a cross-sectional view of the embodiment of FIG. 1 as taken through section line 2—2.

FIG. 3 is a sectional view of a liquid-vapor contacting column showing an alternative construction of the present invention.

FIG. 4 is a cross-sectional view of a modified embodiment of FIGS. 1 and 2.

FIG. 5 is a sectional view of FIG. 4 as taken through section line 5—5.

Referring now more particularly to FIGS. 1 and 2 of the drawing, there is shown a conventional fractionating column or tower 1 having perforated or sieve-type liquid-vapor contacting trays 2 arranged one over the other. Each tray 2 has an imperforate inlet surface 3 forming part of the perimeter thereof. The particular shape of the inlet surface should not be limiting upon the present improvement but is merely presented here by way of example. Each tray also has a perforated portion 10 having perforations 4 therein extending inwardly from the imperforate inlet surface 3 and transversely across part of the column. The perforate portion 10 permits vapor flow from the bottom side of the tray to the top side thereof. The trays may be fastened to the fractionating column by conventional means such as by the use of tray holders (not shown) or the like.

Also included in the column is a downcomer member 5 associated with each tray which is spaced from the column wall in position substantially parallel to the longitudinal axis of the column and in addition spaced above and is coextensive with the inlet imperforate surface 3. The downcomer establishes liquid flow along the column walls and beneath the lower end of member 5 as shown by the arrows in FIGS. 1 and 2. A liquid discharge opening 11 is located opposite the imperforate inlet surface of each tray. A weir or other form of obstruction 6 may be associated with opening 11 to establish a predetermined hydrostatic head of the liquid flowing over plate 2.

Associated with each tray 2 is wall member 7 which separates the imperforate inlet portion 3 and the perforated portion 10 of tray 2. Wall member 7 is preferably imperforate although it is contemplated that a certain amount of free area be provided so that some liquid will pass through wall 7 directly into tray 2. Thus, substantially all of the liquid flow path is directed over wall 7. Connected to wall 7 is a plate member 8 having perforations 9 therein and extending inwardly across a portion of column 1 above part of the perforated portion 10 of tray 2. Thus, the liquid flowing onto the tray is directed over the imperforate section 3 of the tray over wall section 7 and subsequently over the perforated plate 8 before contacting the perforated portion 10 of the tray. This flow pattern has been found to establish favorable conditions whereby frothing of fluid and vapor is initiated prior to distribution of the liquid flow over the perforated portion 10 of the tray. As set forth hereinbefore, once frothing is initiated conditions are induced favorable to frothing or bubbling throughout the tray. An advantage of the particular configuration of the improvement of this invention is that when there is any raining or weeping of liquid through plate 8 it is not lost to a lower tray in the column but is contacted by vapors passing through perforations 4 of tray 2 beneath plate 8. Another advantage is that the configuration of plates 8 and 7 is separate and distinct from plate 2 itself. In other words, members 7 and 8 may be constructed separately and connected to tray 2, once tray 2 is installed within the column. This has the advantage in that members 7 and 8 may be used to upgrade an existing tray in a column which has inactive regions near the inlet side of the tray. It should be noted from FIG. 1 of the drawing that member 7 is a vertical wall member and plate member 8 is substantially parallel to the vapor-liquid contacting tray 2. This particular configuration should not be considered limiting upon this improvement for plate 8 may on one hand slope either downwardly or upwardly toward the center of tray 2 to facilitate frothing, or on the other hand, may be curved to enhance frothing and distribute the liquid. Of course, each application will dictate the slope or curve of plate member 8 for optimum flow characteristics. Furthermore, wall member 7 may be disposed on an angle to facilitate liquid flow over plate member 8.

Moreover, it is also contemplated that wall member 7 and perforated plate member 8 be one in the same. In other words, such members may be fabricated from a single stock of material having a substantially imperforate portion and a perforated portion. In some cases it has been found that the efficiency can be increased by placing some perforations in the wall member 7.

As set forth hereinbefore, in some of the large diameter columns the problem of liquid flow across the tray develops because the distance the liquid has to flow across the plate is greater at the perimeters than in the central region. In FIG. 3 there is shown modification of the perforate plate member. Most details of this column and tray of FIG. 3 are similar to those in FIGS. 1 and 2 and thus corresponding members are designated with primed numerals. The perforated plate member 8' is, however, preferably shaped in a manner to establish a more uniform liquid flow across the particular tray wherein such member is utilized. Specifically, in the embodiment of FIG. 3 plate member 8' has a curved edge 12 which is convex in relation to wall member 7'. Because of this shape, the liquid flow will find less resistance at the perimeter regions of the column which will facilitate liquid flow near the perimeters. Since perimeter flow is facilitated, the flow across tray 2' will be increased near the perimeters. Since typically less fluid flow occurs in perimeter regions the increase in flow will aid in establishing uniform flow over tray 2'. Of course, the amount of increase required to establish uniform flow will depend on the particular shape of plate member 8' and on the column diameter and flow rates of liquid and vapors. But it is readily seen that for a given column and given flow rates, plate 8' may be shaped to establish a substantially uniform liquid flow across the perforated portion of tray 2' which is desirable for efficient column design.

Referring now to FIGS. 4 and 5 of the drawing, there is shown a modification of the embodiment of FIGS. 1 and 2. To the top of plate member 8 directional vanes 15 have been connected. Vanes 15 aid in distributing the liquid across tray 2 in uniform manner. In other words, the particular shape and arrangement of vanes 15 will increase the liquid flow to the perimeters of tray 2 which will help establish uniform flow across all of tray 2. Of course, as in the embodiment of FIG. 3, the amount of increase of flow required to establish uniform flow will depend on column size and flow rates and thus the sizing and positioning of vanes 15 will have to be determined with each application.

It should be readily seen that the principals incorporated in utilizing members 7 and 8 of FIGS. 1 and 2 and members 7' and 8' of FIG. 3 and directional vanes of FIGS. 4 and 5 are not limited solely to the sieve trays herein illustrated and discussed. For example, other contacting trays such as bubble, cap, rippled, valve, etc., could successfully be employed with the utilization of the improvement of this invention.

Of course, the drawings presented are schematical in nature and thus should not be considered limiting upon the design of any contacting tray. For example, the perforations in the plates, etc., are shown for illustrative purposes and the percent-free area and the form of these perforations will vary considerably, depending upon the physical properties of the liquids and vapors of the particular operation. It must be kept in mind that the percent-free area in the plate should be controlled to give the maximum frothing before the froth reaches the tray. Furthermore, the dimensions for the particular column and its elements cannot be set forth herein in great detail since a great many factors will affect the dimensions which are required in any specific environment.

I claim as my invention:

1. In a column for contacting a liquid with a vapor and having vertically spaced vapor-liquid contacting trays, with at least one of such trays having a perforated portion for permitting gas flow therethrough, an imperforate liquid inlet portion, and downcomer means extending downwardly to terminate just above the inlet imperforate portion of the next lower tray, the improved tray construction which comprises, a wall member connected to and extending above said tray, said wall member separating the imperforate portion of said tray and the perforated portion thereof, whereby the liquid flow path is directed over said wall member, and a perforated plate member connected to the upper portion of said wall member and extending laterally inwardly across a portion of said column above a part of the perforated portion of said tray, the innermost edge of said perforated plate member being of convex shape with relation to said wall member to establish uniform flow across the perforated portion of said tray, whereby the liquid flow path is directed over said perforated plate member to establish initial frothing of fluid and vapor prior to the distribution of the liquid flow over the perforated portion of said tray.

2. The column according to claim 1 wherein said wall member is substantially imperforate.

3. The column according to claim 1, wherein said perforated plate member is spaced above and is substantially parallel to said vapor-liquid contacting tray.

4. The column according to claim 1, wherein said wall member is substantially vertical.

5. In a column for contacting a liquid with a vapor and having vertically spaced vapor-liquid contacting trays, with at least one of such trays having a perforated portion for permitting gas flow therethrough, an imperforate liquid inlet portion, and downcomer means extending downwardly to terminate just above the inlet imperforate portion of the next lower tray, the improved tray construction which comprises, a wall member connected to and extending above said tray, said wall member separating the imperforate portion of said tray and the perforated portion thereof, whereby the liquid flow path is directed over said wall member, and a perforated plate member connected to the upper portion of said wall member and extending laterally inwardly across a portion of said column above a part of the perforated portion of said tray, the top of said perforated plate member being provided with directional vanes for improved distribution of liquid across said tray, whereby the liquid flow path is directed over said perforated plate member to establish initial frothing of fluid and vapor prior to the distribution of the liquid flow over the perforated portion of said tray.

* * * * *